United States Patent
Li et al.

(10) Patent No.: US 9,888,506 B2
(45) Date of Patent: Feb. 6, 2018

(54) CONTENTION-BASED INTEGRATION OF DEVICE TO DEVICE (D2D) NETWORKS WITH WIRELESS INFRASTRUCTURE

(71) Applicant: Huawei Technologies Co., Ltd., Shenzhen (CN)

(72) Inventors: Xu Li, Nepean (CA); Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 555 days.

(21) Appl. No.: 13/973,307

(22) Filed: Aug. 22, 2013

(65) Prior Publication Data

US 2015/0056987 A1 Feb. 26, 2015

(51) Int. Cl.
*H04W 84/18* (2009.01)
*H04W 76/02* (2009.01)
*H04W 8/00* (2009.01)

(52) U.S. Cl.
CPC ......... *H04W 76/023* (2013.01); *H04W 8/005* (2013.01)

(58) Field of Classification Search
CPC . H04W 84/18; H04W 8/005; H04W 56/0015; H04W 40/246; H04W 28/0215; H04W 40/12; H04W 40/22; H04W 4/005; H04W 56/001; H04W 56/002; H04W 84/20; H04W 48/16; H04L 45/02; H04L 67/104; H04L 67/106
See application file for complete search history.

(56) References Cited

U.S. PATENT DOCUMENTS

| 2006/0094456 A1* | 5/2006 | Rittle ................. H04W 48/16 455/519 |
| 2009/0040985 A1* | 2/2009 | Barnawi .............. H04B 7/2681 370/336 |
| 2010/0279733 A1* | 11/2010 | Karsten ................ H04W 48/18 455/552.1 |

(Continued)

FOREIGN PATENT DOCUMENTS

| CN | 103250435 A | 8/2013 |
| GB | 2498765 | 7/2013 |

(Continued)

OTHER PUBLICATIONS

International Search Report and Written Opinion received in International Application No. PCT/CN2014/084759, dated Nov. 19, 2014, 12 pages.

*Primary Examiner* — Charles Appiah
*Assistant Examiner* — Edward Zhang
(74) *Attorney, Agent, or Firm* — Slater Matsil, LLP (57) ABSTRACT

Efficient D2D link integration can be achieved by allowing mobile devices to independently initiate D2D/connection-proxy discovery without re-broadcasting beacons originating from the wireless access point. A mobile station wanting to establish a D2D link may broadcast a search message to neighboring mobile stations, which may return offer messages specifying a connection quality and/or parameters of the candidate indirect connection. The requesting mobile station may then select one of the responding neighboring mobile stations through which to establish the indirect connection. Responding mobile stations may delay offer message transmission by a period that is proportional to a connection quality to reduce offer message redundancy.

29 Claims, 10 Drawing Sheets

(56) References Cited

U.S. PATENT DOCUMENTS

| | | | |
|---|---|---|---|
| 2011/0032818 A1* | 2/2011 | Yamaguchi | H04L 45/02 370/225 |
| 2011/0117907 A1 | 5/2011 | Hooli et al. | |
| 2012/0243431 A1* | 9/2012 | Chen | H04W 72/0406 370/252 |
| 2013/0064138 A1* | 3/2013 | Hakola | H04W 8/005 370/255 |
| 2013/0157670 A1* | 6/2013 | Koskela | H04W 74/006 455/450 |
| 2013/0182584 A1* | 7/2013 | Maguluri | H04W 76/023 370/252 |
| 2013/0195026 A1* | 8/2013 | Johnsson | H04L 5/1469 370/329 |
| 2013/0288608 A1* | 10/2013 | Fwu | H04W 76/023 455/63.1 |
| 2013/0294331 A1* | 11/2013 | Wang | H04B 7/155 370/315 |
| 2014/0269646 A1* | 9/2014 | Ramasamy | H04W 76/023 370/338 |

FOREIGN PATENT DOCUMENTS

| | | |
|---|---|---|
| WO | 2012049351 A1 | 4/2012 |
| WO | 2012166969 A1 | 12/2012 |
| WO | 2013086316 A1 | 6/2013 |

\* cited by examiner

CONTENTION-BASED INTEGRATION OF DEVICE TO DEVICE (D2D) NETWORKS WITH WIRELESS INFRASTRUCTURE

TECHNICAL FIELD

The present invention relates generally to wireless communications, and in particular embodiments, to contention-based integration of device to device (D2D) networks with wireless infrastructure.

BACKGROUND

Next generation wireless communication protocols are likely to implement device-to-device (D2D) communication modes, where mobile stations communicate directly with one another rather than relaying wireless signals through an intermediate cellular infrastructure, e.g., cell towers, etc. D2D communication may have a variety of practical advantageous, such as extending the coverage area of a cell or wireless local area network. One challenge for D2D communication modes is reliably establishing D2D links between neighboring mobile stations in a manner that integrates the D2D link into existing wireless infrastructure.

SUMMARY OF THE INVENTION

Technical advantages are generally achieved, by embodiments of this disclosure which describe contention-based integration of device to device (D2D) networks with wireless infrastructure.

In accordance with an embodiment, a method for device to device (D2D) link establishment is provided. In this example, the method includes broadcasting a search message requesting D2D discovery, and receiving an offer message from a neighboring mobile station. The offer message offers to facilitate an indirect connection between the receiving mobile station and a wireless access point (AP). The method further includes establishing the indirect connection between the mobile station and the wireless AP. The indirect connection includes one or more D2D interfaces and a device to infrastructure (D2I) interface. An apparatus for performing this method is also provided.

In accordance with another embodiment, another method for device to device (D2D) link establishment is provided. In this example, the method includes receiving a search message for discovering radio connections from a requesting mobile station to a wireless access point (AP), setting a delay timer in accordance with a connection quality of a candidate connection, and determining whether the requesting mobile station sends a connect message to establish a direct or indirect connection with the wireless AP prior to expiration of the delay timer. The method further includes sending an offer message to the requesting mobile station if the requesting mobile station fails to establish a direct or indirect connection with the wireless AP prior to expiration of the delay timer. The offer message indicates an offer to facilitate the candidate connection. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

One way of integrating D2D links into a wireless infrastructure is to re-broadcast beacon signals originating from the base station to neighboring mobile stations. For example, mobile stations configured for D2D communication may re-broadcast beacon signals to notify neighboring mobile stations of the potential to establish an indirect connection via the sending mobile station. However, re-broadcasting beacon messages generally requires mobile devices to frequently re-transmit beacon messages, and therefore may be relatively energy inefficient from the perspective of mobile devices which typically have finite battery resources. As such, more efficient D2D link integration techniques are desired.

Aspects of this disclosure achieve efficient D2D link integration by allowing mobile devices to independently initiate D2D/connection-proxy discovery without re-broadcasting beacons originating from the wireless access point. More specifically, a mobile station wanting to establish a D2D link may broadcast a search message to neighboring mobile stations. Thereafter, neighboring mobile stations which are capable of facilitating D2D link/connections may return offer messages to the requesting mobile station. The offer messages may specify a connection quality available via the neighboring mobile station, as well characteristics and/or parameters of the neighboring mobile station. The requesting mobile station may select one of the responding neighboring mobile stations through which to establish the indirect connection, and thereafter establish, and reserve resources over, the indirect communication. To reduce redundancy and/or contention during D2D link establishment, neighboring mobile stations may delay offer message transmission by a period that is proportional to a connection quality of the indirect connection in which they are capable of providing, thereby allowing mobile stations that offer higher quality connections to return offer messages more quickly than mobile stations offering lower quality connections. Neighboring mobile stations may also be configured to abort an offer message transmission upon determining that the requesting mobile station has established an indirect connection with a different neighboring mobile station, as might be evidenced by the transmission of a connect message by the requesting mobile station. These and others aspects of this disclosure are described in greater detail below.

Figure 1:
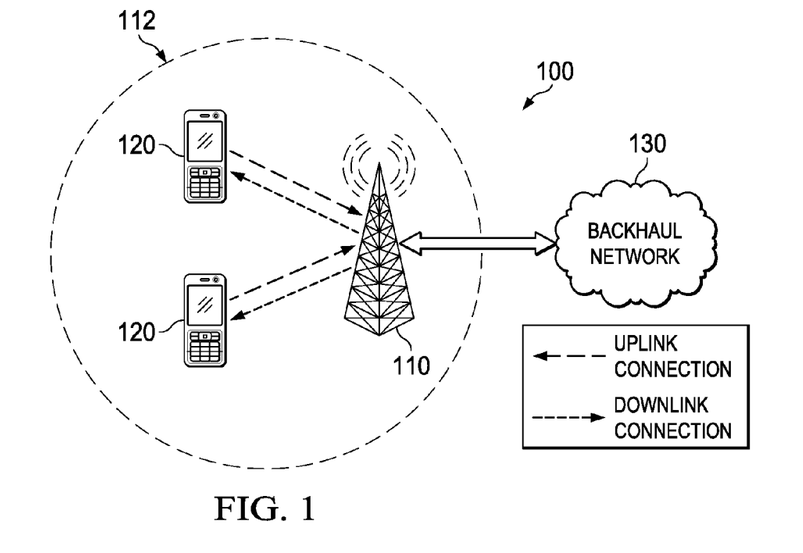
FIG. 1 illustrates a diagram of a wireless network for communicating data.

FIG. 1 illustrates a network 100 for communicating data. The network 100 comprises an access point (AP) 110 having a coverage area 112, a plurality of user equipments (UEs) 120, and a backhaul network 130. The AP 110 may comprise any component capable of providing wireless access by, inter alia, establishing uplink (dashed line) and/or downlink (dotted line) connections with the UEs 120, such as a base station, an enhanced base station (eNB), a femtocell, and other wirelessly enabled devices. The UEs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

Figure 2:
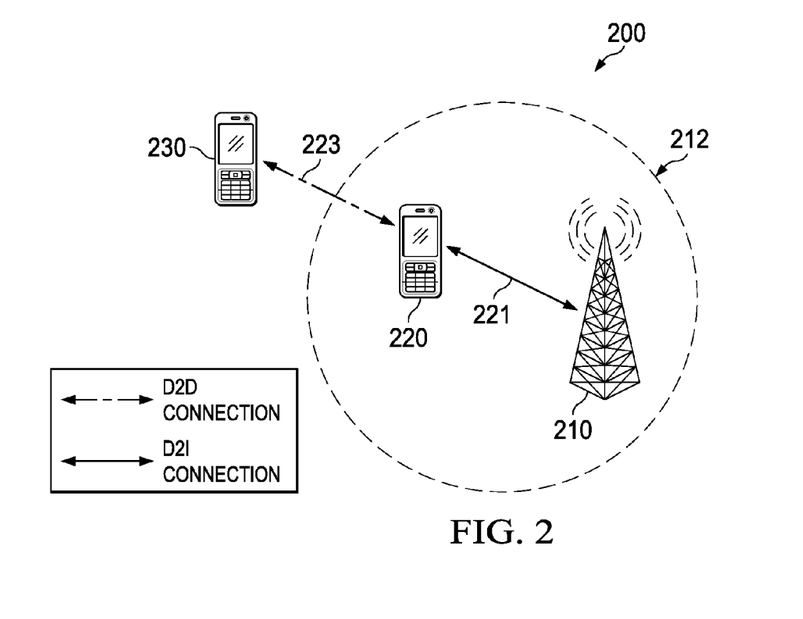
FIG. 2 illustrates a diagram of an embodiment network for D2D communications.

D2D interfaces can be used to extend the coverage area of a base station or access point. FIG. 2 illustrates an embodiment network 200 in which a D2D connection 223 is used to extend the range/coverage-area of an AP 210. As shown, the network 200 comprises the AP 210 having a coverage area 212, and a plurality of UEs 220, 230. The UE 220 resides within the coverage area 210, and consequently is capable of establishing a device to infrastructure (D2I) interface 221 with the AP 210. However, the UE 230 is located outside the coverage area 212, and consequently may be unable to establish a direct radio interface with the AP 210. Alternatively, the UE 230 may be on a cell edge of the coverage area 212, and may be unable to achieve a high bit-rate direct radio interface with the AP 210 without creating excessive interference to neighboring cells and/or users. Accordingly, the UE 230 may establish an indirect radio interface with the AP 210 via the D2D interface 223 and the D2I interface 221, with the UE 220 being configured to relay traffic over the D2D/D2I interfaces 221, 223.

Figure 3:
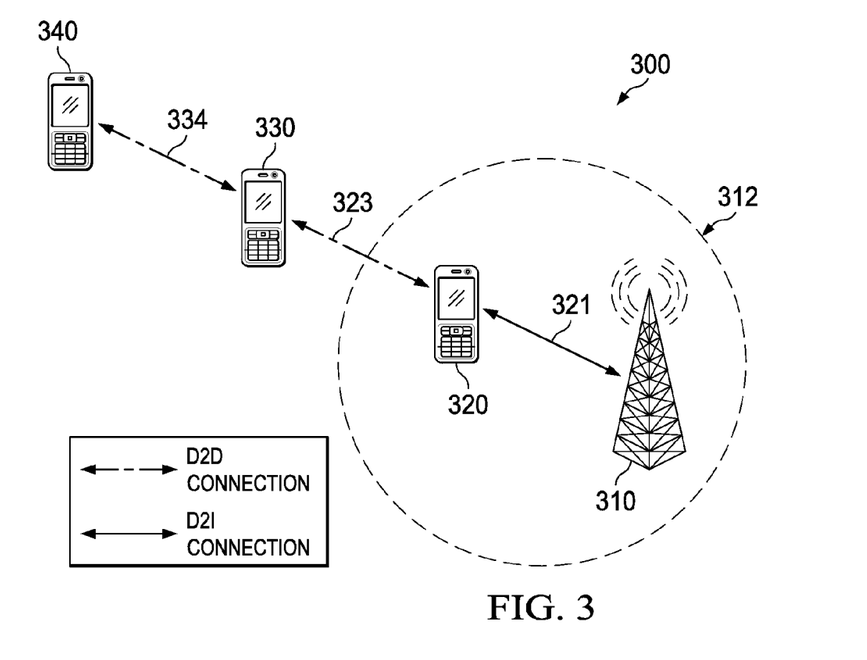
FIG. 3 illustrates a diagram of another embodiment network for D2D communications.

Multiple D2D connections can be joined in series to extend the coverage area of a base station or access point. FIG. 3 illustrates an embodiment network 300 for using multiple D2D connections 323, 334 to extend the coverage area 312 of an AP 310. As shown, the network 300 comprises the AP 310 and a plurality of UEs 320, 330, 340. The UE 340 establishes an indirect link with the AP 310 over the D2D connections 323, 334 and the D2I connection 321.

Figure 4A:
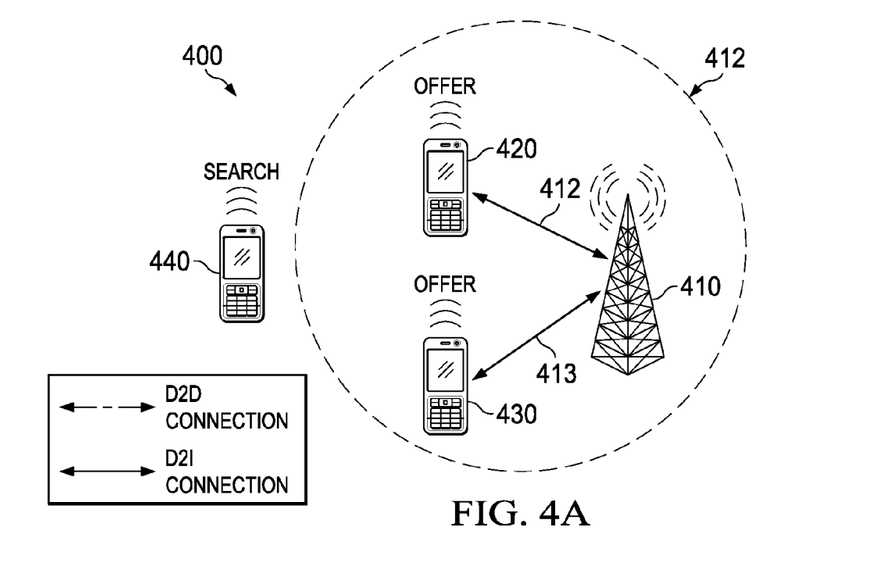
FIGS. 4A-4C illustrate diagrams of yet another embodiment network for D2D communications.
Figure 4B:
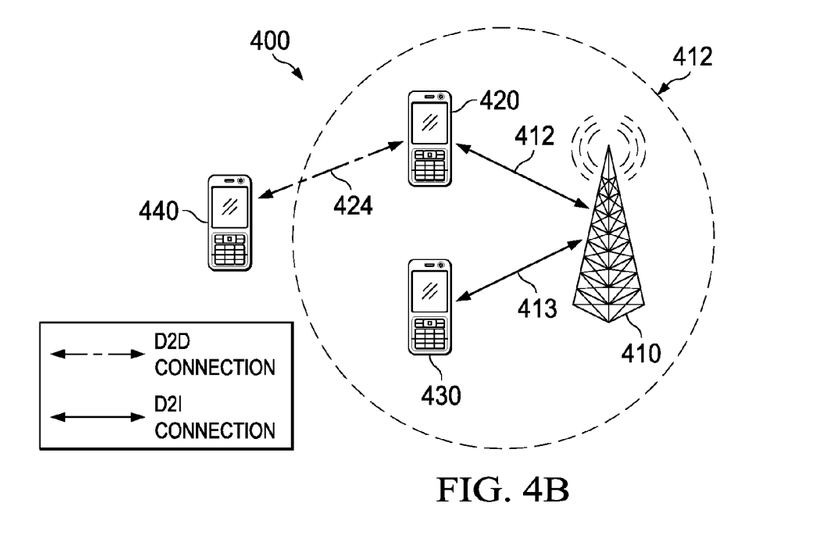
Figure 4C:
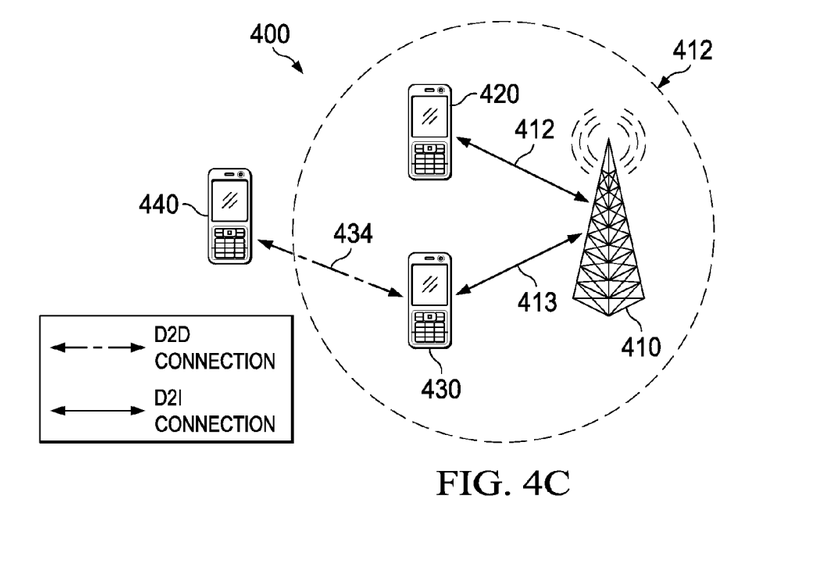

In some implementations, mobile stations requesting indirect connections may receive offers from multiple neighboring devices. FIGS. 4A-4C illustrate an embodiment network 400 in which a requesting UE 440 receives offers from multiple neighboring UEs 420, 430 to establish indirect connections with an AP 410. As shown in FIG. 4A, the UE 440 broadcasts a search message requesting an indirect D2D connection with an available AP. The search message is received by both of the neighboring UEs 420, 430, who return offer messages to the UE 440. The offer messages may advertise a capability of establishing indirect radio connections between the UE 440 and the AP 410. For example, the UE 420 may send an offer message to establish an indirect radio connection extending over the D2D connection 424 and the D2I connection 412 as shown in FIG. 4B, while the UE 430 may send an offer message advertising an ability to establish an indirect radio connection extending over the D2D connection 434 and the D2I connection 413 as show in FIG. 4C. In one example, the respective offers may include connection quality information for the entire indirect connections and/or for individual ones of the D2I/D2D connections 412, 413, 424, 434. The UE 440 may select one (or both) of the UEs 420, 430 for facilitating an indirect connection with the AP 410 based on the offers. Thereafter, the UEs 440 may establish the indirect connection and begin communicating traffic.

In some embodiments, the UEs 420, 430 may delay transmission of their offer messages by a period that is proportional (or related) to a quality of their advertised connections. For example, if the UE 420 is capable of providing a higher quality connection than the UE 430, then the UE 420 may transmit an offer message prior to the UE 430. This may be accomplished by setting a delay timer based on the projected connection quality of the indirect connections, or based on an actual or projected connection quality of the D2I/D2D connections 412, 413, 424, 434. In some embodiments, the UE 430 may abort transmission of his offer message upon detecting the establishment of an indirect connection by the UE 440 via the UE 420.

Figure 5:
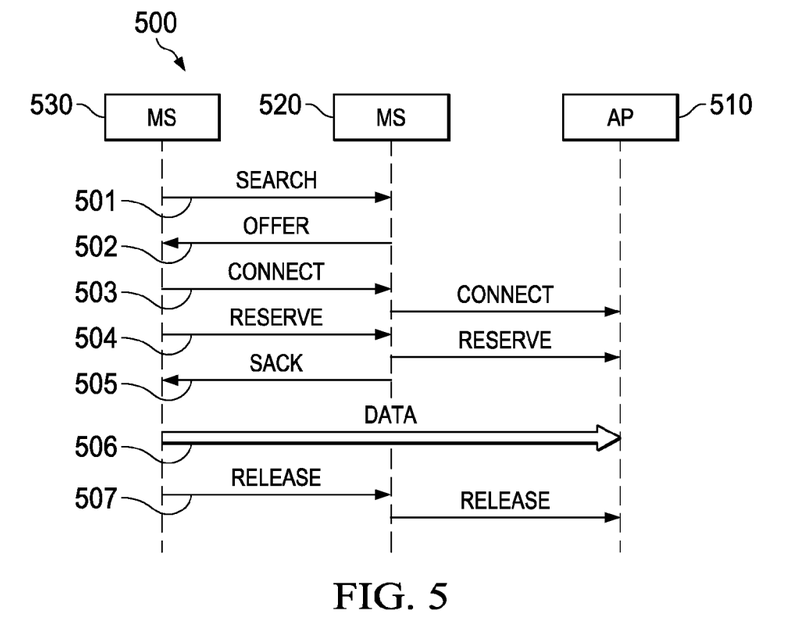
FIG. 5 illustrates a protocol diagram of an embodiment communications sequence for establishing an indirect connection.

Aspects of this disclosure provide a messaging sequence for D2D discovery and link establishment. FIG. 5 illustrates a protocol diagram of an embodiment messaging sequence 500 between an AP 510, a mobile station 520, and a requesting mobile station 530. As shown, the embodiment messaging sequence 500 begins when the mobile station 530 sends a search message 501 to mobile station 520. The search message 501 may include a device ID and a sequence number. Each device may maintain a monotonically increasing sequence number, which is incremented each time a search is performed. The sequence number may serve as a unique identifier for the search process, and may help devices to identify and discard stale messages. The mobile station 520 responds by sending an offer message 502 to the mobile station 530. The offer message 502 may include a device ID, a sequence number, a sender ID, and a connection quality. The device ID and the sequence number may identify the search message to which the offer corresponds. The connection quality may indicate a quality of a connection proxy being offered. Upon receiving the offer 502, the mobile station 530 may initiate establishment of the connection proxy by sending a connect message 503 to the mobile station 520. The connect message 503 may include a device ID, a sequence number, a receiver ID, and a connection quality. The connection quality may be a connection quality corresponding to the indirect connection, and may be used to update connection proxies of neighboring devices as described in FIGS. 9-10. The connection quality of a device is subject to the connection quality and resource availability of the device's connection proxy, the quality of the link between them, and the hop count of the device to the connected AP; the connection quality of an AP depends on its own resource availability. The mobile station 520 may forward the connect message 503 to the AP 510.

Thereafter, the mobile station 530 may reserve resources on the indirect connection, the D2D connection, and/or the D2I connection by sending a reserve message 504 to the mobile station 520. The reserve message 504 may include the session ID and a QoS requirement for the indirect connection. The mobile station 520 may forward the reserve message 504 to the AP 510. An acknowledgment message 505 may be returned to the mobile station 530 in response to the reserve message 504. The acknowledgment message 504 may originate from the mobile station 520 or from the AP 510, and may indicate whether or not the requested resources could be reserved. For example, the acknowledgement message 505 may indicate a negative acknowledgment if the requested resources were unable to be reserved. Alternatively, the acknowledgement message 505 may indicate a positive acknowledgment if the requested resources were successfully reserved. If the acknowledgement message 505 is a positive acknowledgment, then the mobile station 530 will proceed to communicate data 506 over the reserved resources of the indirect connection. After communicating the data 506, the mobile station 530 sends a release message 507 to release the resources and tear down the indirect connection. The acknowledgment messages and the release messages may indicate a session ID.

D2D enabled devices may include data structures for establishing, maintaining, updating, and recording connection proxies (past, present, available, or otherwise). The data structures may include a direct connection table for recording direct connections to APs and the quality of those connections. The direction connection table may include an AP identifier (ID), a connection quality, and a timestamp. The data structure may also include a connection proxy table for recording information about existing and/or available connection proxies, as well as information about the devices providing (or capable of providing) the connection proxies. In an embodiment, the connection proxy table specifies a device ID and a connection quality of each available and/or existing connection proxy. The data structure may also include a session table storing session information and related routing information. The session table may include a session ID, a prior hop address or ID, a next hop address or ID, a QoS requirement, resource reservation information, maximum silence duration information, and timestamp information for each existing or available session. Any entry associated with a timestamp in the above data structures may be removed upon becoming stale, e.g., per the timestamp indication. Upon removal, related actions may be performed, such as releasing resources when a session entry is removed.

Figure 6:
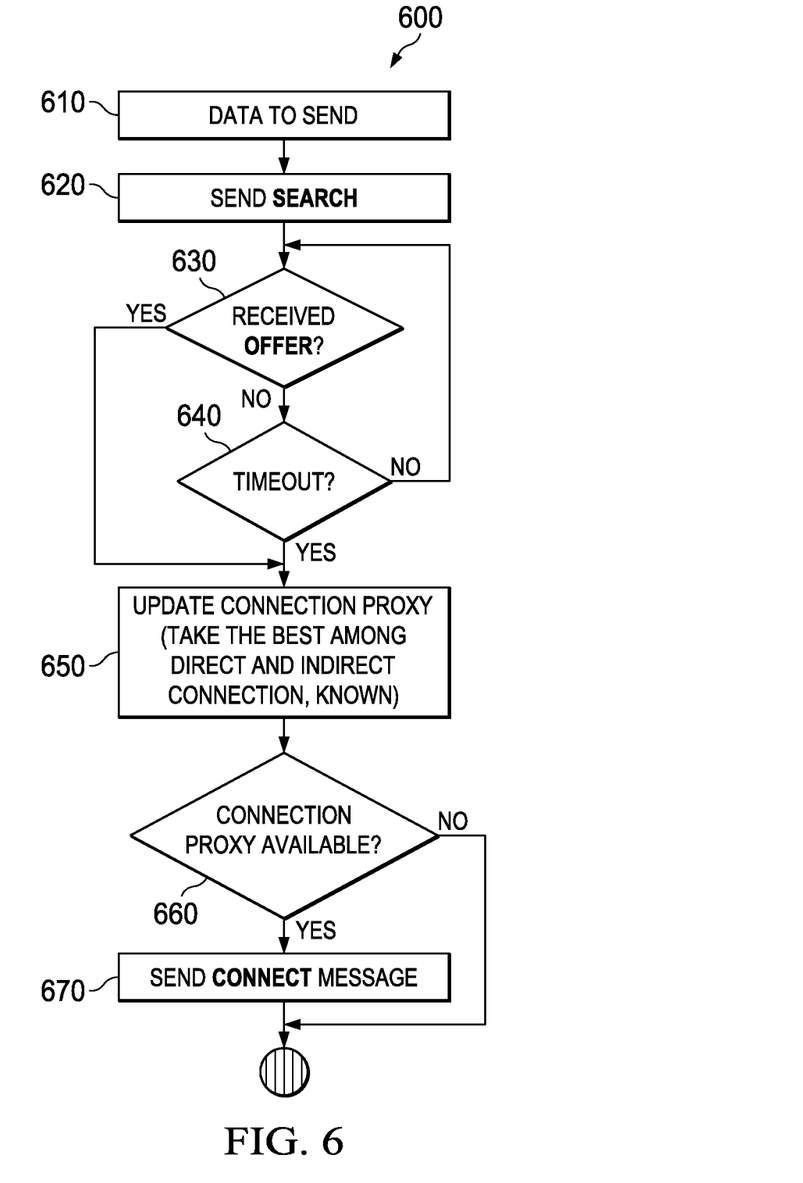
FIG. 6 illustrates a flowchart of an embodiment method for establishing an indirect connection.

A device searches for the best connection to the infrastructure by sending a search message. A search may be considered successful when the requesting device receives an offer message within a time window. A search may be considered unsuccessful when the requesting device fails to receive an offer message within a time window. The time window is defined so as not to miss normal offers. Offers may be transmitted by neighboring mobile stations, as well as by access points (APs). The requesting device takes the best among the offered connection (direct, indirect, or otherwise) by sending a connect message to the offering device or AP. The connect message may establish a connection proxy associated with the direct/indirect connection. FIG. 6 illustrates a method 600 for establishing a D2D connection in accordance with embodiments of this disclosure, as may be performed by a requesting mobile station. As shown, the method 600 begins at step 610, with the mobile station decides to search for a connection proxy. The mobile station may decide to search for a connection proxy when the mobile station has data to send but no connection proxy available for communicating the data to an access point. Alternatively, the mobile station may decide to search for a connection proxy upon being asked for connection help (when it itself does not has a communication proxy yet), upon the departure/loss of a connection proxy, upon receiving a resource reservation on connection proxy, or upon receiving a resource release by a neighboring device. Thereafter, the method 600 proceeds to step 620, where the mobile station sends a search message. Subsequently, the method 600 proceeds to steps 630-640, where the mobile station determines whether or not an offer has been received prior to the expiration of a timeout. Subsequently, the method 600 proceeds to step 650, where the mobile station updates a connection proxy. In some embodiments, updating a connection proxy may include entering connection proxy information into an appropriate data structure in order to record potential links/connections. Thereafter, the method 600 proceeds to step 660, where the mobile station determines whether a connection proxy is available. If so, then the method proceeds to step 670, where the mobile station selects one of the available connection proxies, and sends a connect message to establish that connection proxy.

Figure 7:
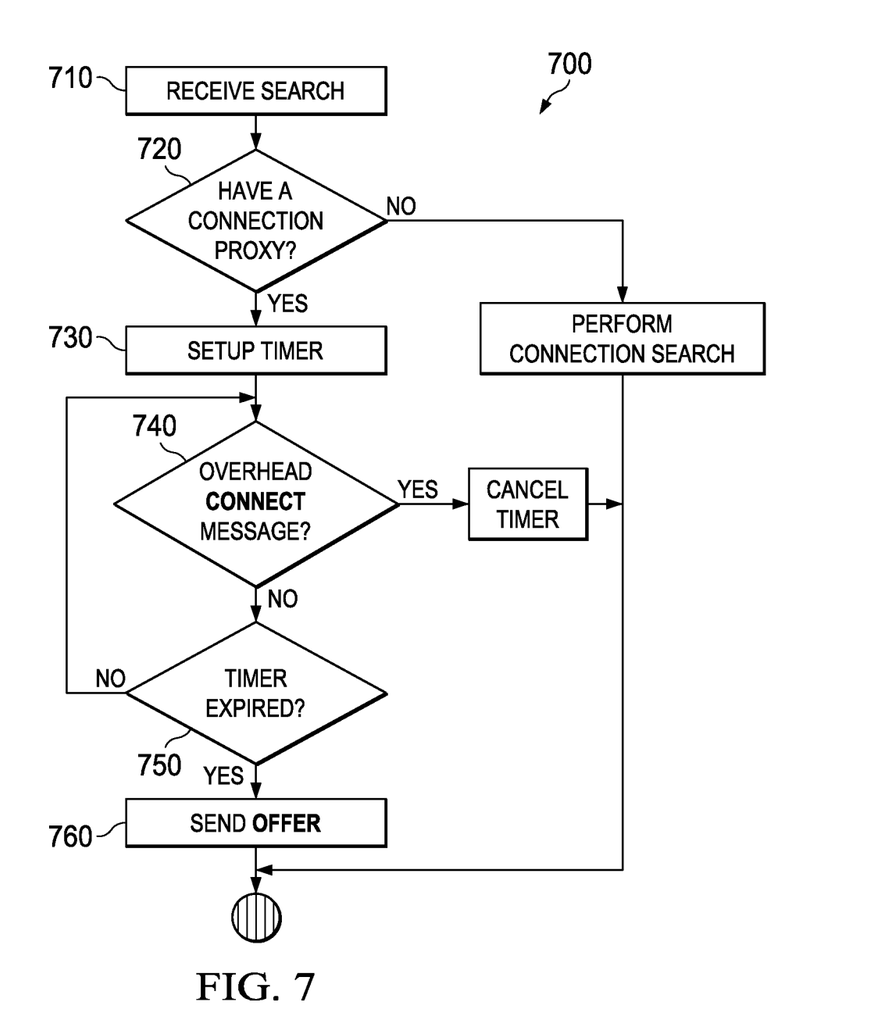
FIG. 7 illustrates a flowchart of an embodiment method for processing a search message.

Devices may receive search messages from neighboring devices. FIG. 7 illustrates a method 700 for processing a search message, as might be performed by an offering mobile station or by an access point. As shown, the method 700 begins with step 710, or the mobile station receives a search request. Thereafter, the method 700 proceeds to step 720, where the mobile station determines whether a connection proxy is available. A connection proxy may be available if the mobile station has a direct or indirect connection, or the ability to form a direct or indirect connection, with an access point. If a connection proxy is unavailable, the mobile station may perform connection search. If a connection proxy is available, then the method 700 proceeds to step 730, where the mobile station sets up a timer. In some embodiments, the timer may be set in accordance with a connection quality in which the mobile station is capable of providing. Thereafter, the method 700 proceeds to steps 740-750, where the mobile station determines whether the requesting mobile station has sent a connect message to a different neighboring mobile station prior to expiration of the timer. If so, the mobile station aborts the offer message transmission, e.g., turns off the timer and abstains from sending an offer message. If a connect message is not overheard, then the method 700 proceeds to step 760, where the mobile station sends an offer message.

Figure 8:
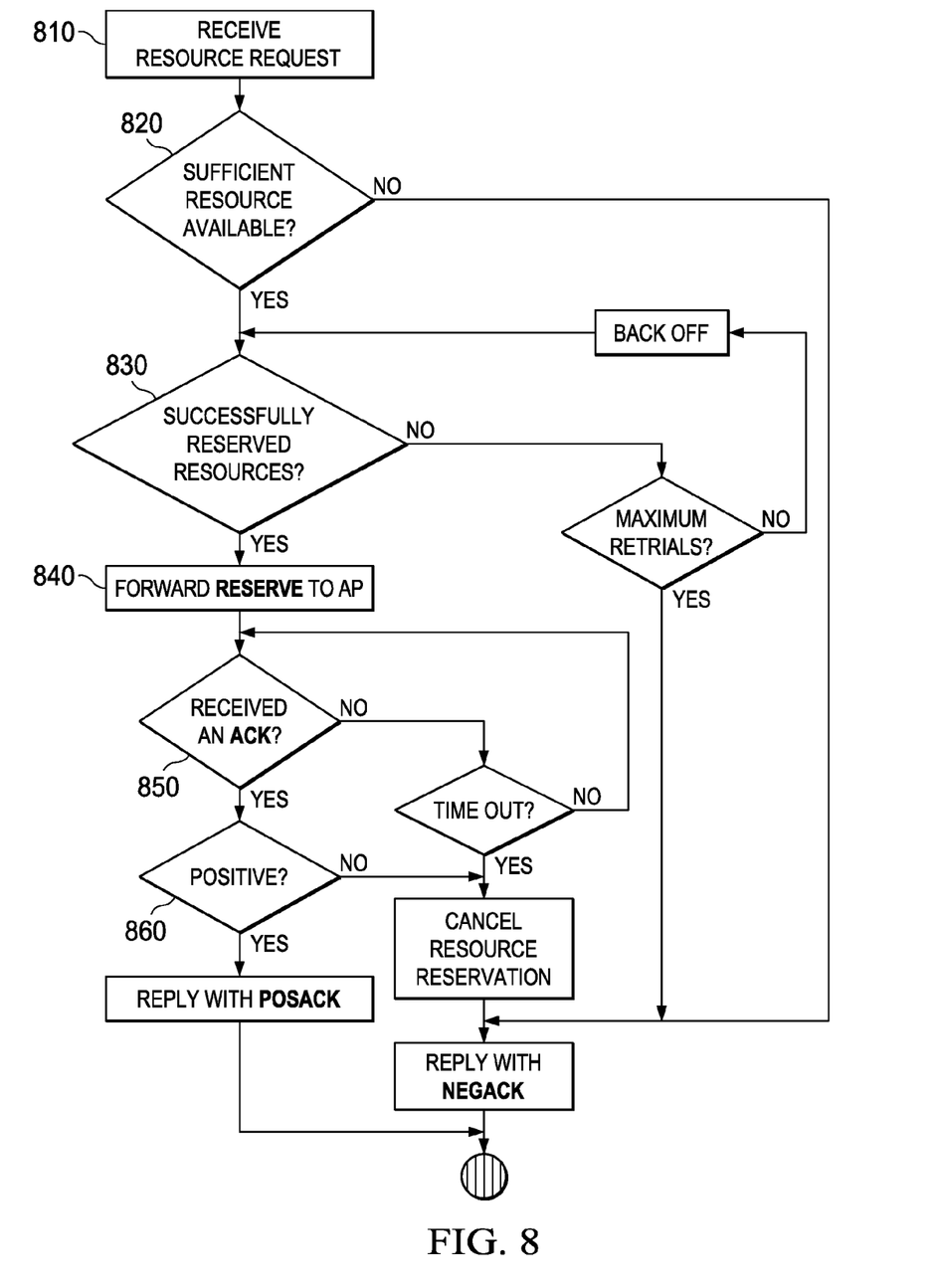
FIG. 8 illustrates a flowchart of an embodiment method for reserving resources over an indirect connection.

After sending an offer message, an offering device may receive a connect message to establish a connection proxy. Thereafter, the offering device may receive a resource reservation message from the requesting device to reserve resources over the connection proxy. FIG. 8 illustrates a method 800 for receiving and processing a resource request message, as may be performed by offering device. As shown, the method 800 begins with step 810, where the mobile station receives a resource request. Thereafter, the method 800 proceeds to step 820, where the mobile station determines whether sufficient resources are available on the connection proxy. The resources available on the connection proxy may be the minimum amount of available bandwidth on the available component connections (e.g., D2D, D2I, or otherwise). In some embodiments, the resources available must meet a certain QoS requirement specified by the resource request. If there are not enough resources available on the connection proxy, the mobile station replies to the resource request with a negative acknowledgment. If there are sufficient available resources on the connection proxy, then the method 800 proceeds to steps 830, where the mobile station attempts to reserve the resources. In some implementations, resource reservations may be performed in a contentious manner by sending a request message over a contention-based control channel. In such implementations, the mobile station may perform a maximum number of retrials before aborting a resource reservation attempt. If the mobile station is successful in reserving the requested resources over the connection proxy, then the method 800 proceeds to step 840, where the mobile station forwards the reserve message to a device associated with the connection proxy. The device associated with the connection proxy may be an access point or an intermediate mobile device. Next, the method 800 proceeds to steps 850-860, where the mobile station determines whether a positive acknowledgment message is received prior to the expiration of a timer. If so, the mobile station sends a positive acknowledgment to the requesting mobile station, e.g., the sender of the resource request. Otherwise, the mobile station cancels the resource reservation and sends a negative acknowledgment to the sender of the resource request message.

Figure 9A:
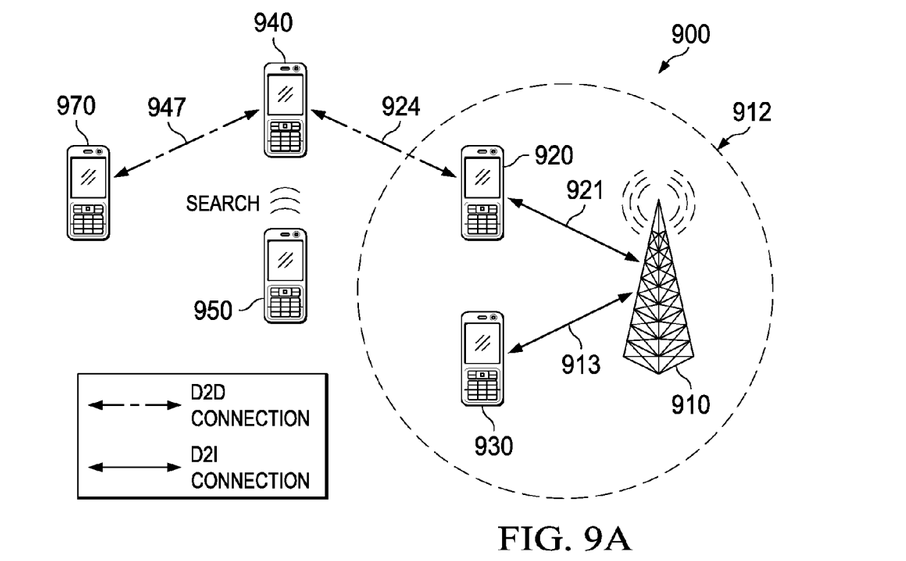
FIGS. 9A-9E illustrates a diagram of yet another embodiment network for D2D communications.
Figure 9B:
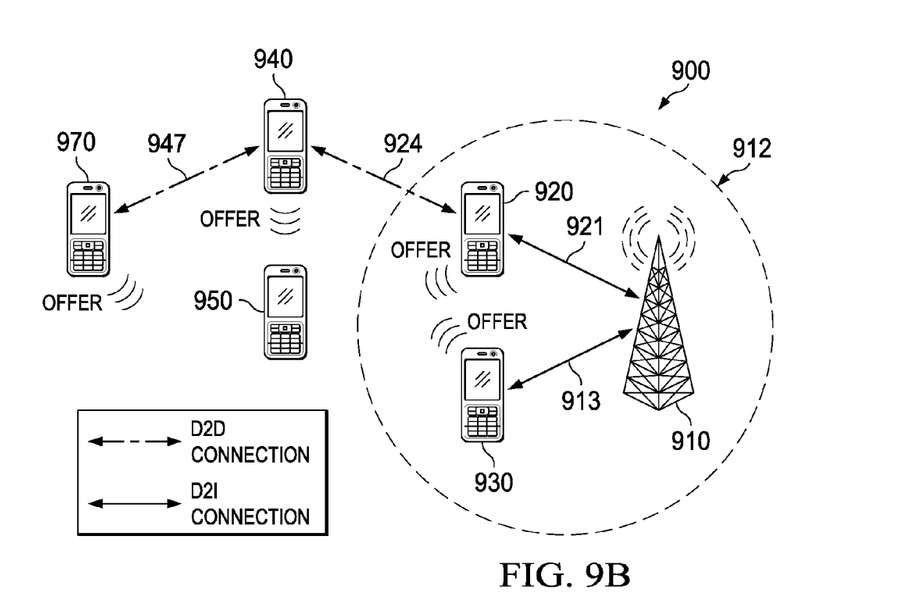
Figure 9C:
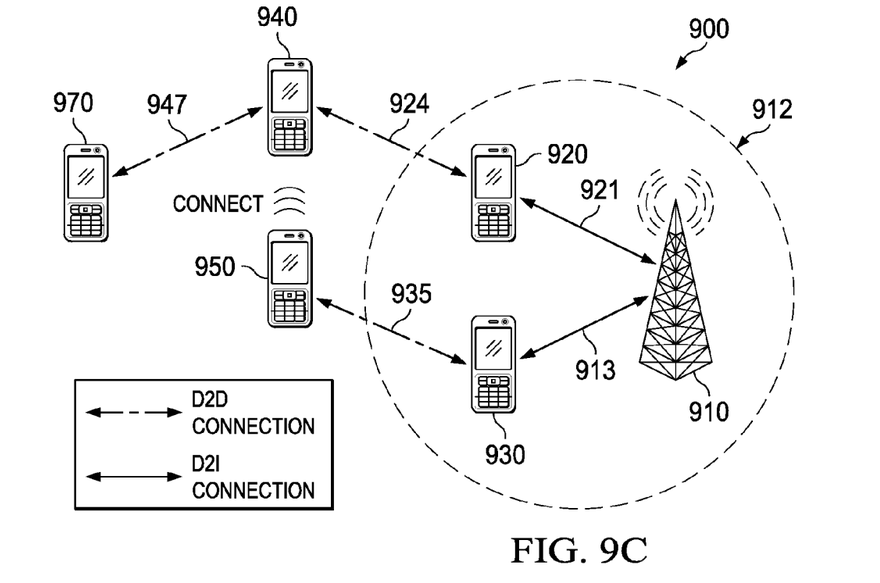
Figure 9D:
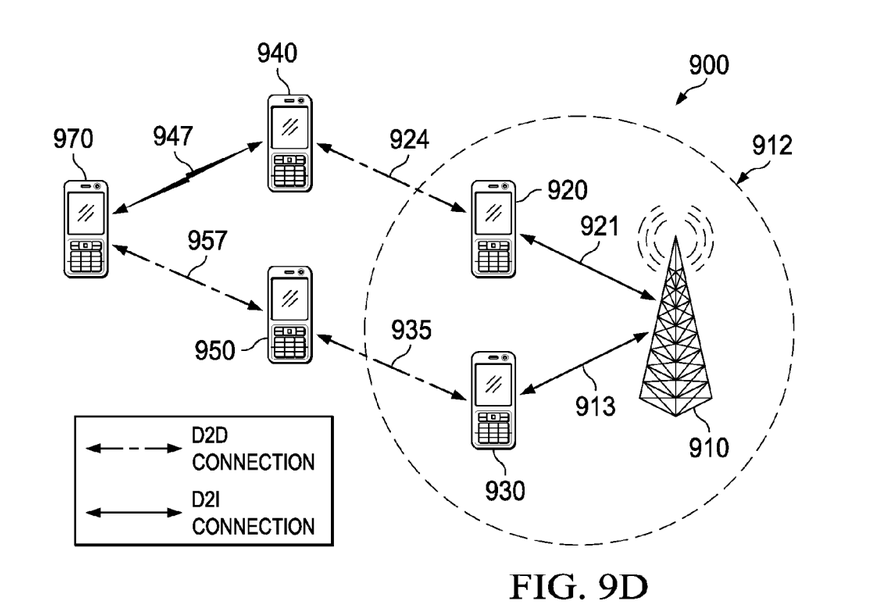
Figure 9E:
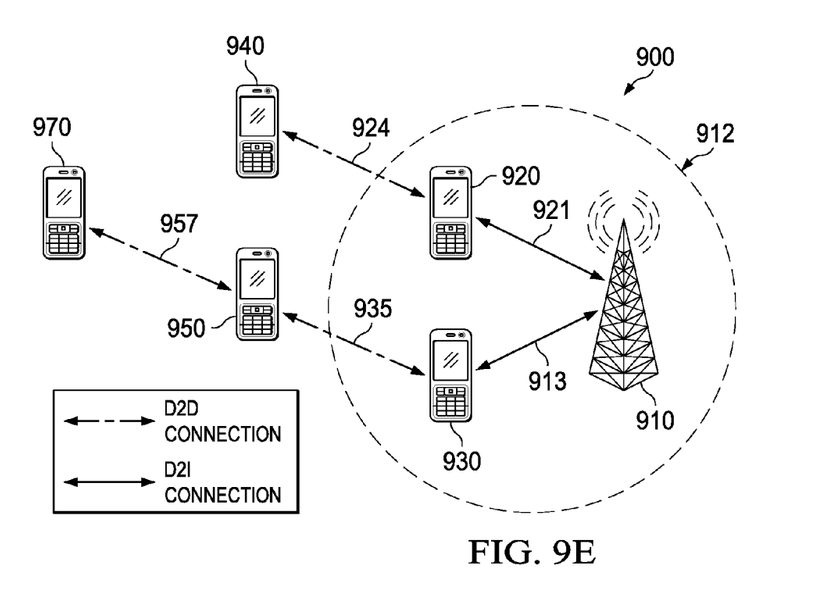

In some embodiments, a neighboring mobile station may eavesdrop on connect messages in order to update its own connection proxy and/or data structure. FIGS. 9A-9E illustrate an embodiment network 900 in which a mobile station 970 updates his connection proxy to perform path optimization for his indirect connection. First, the mobile station 950 searches for an indirect connection by sending a search message as shown in FIG. 9A. Thereafter, each of the mobile stations 920, 930, 940, and 970 transmit offer messages offering to facilitate an indirect connection to the AP 910. The mobile station 950 selects the indirect connection offered by the mobile station 930, and sends a connect message to establish an indirect connection over the D2D interface 935 and the D2I interface 913. The connect message is overheard by the mobile station 970, who presently has a connection proxy established for a first indirect connection extending over the D2D interfaces 947, 924 and the D2I interface 921. The mobile station 970 determines that a second indirect connection extending through the mobile station 950 is preferable to the first indirect connection in accordance with information carried in the eavesdropped connect message. The mobile station 970 thereafter proceeds to update his connection proxy to the second indirect connection that includes the D2D interfaces 957, 935 and the D2I interface 913 as shown in FIG. 9D. Lastly, the mobile station 970 tears down the first indirect connection as shown in FIG. 9E. Notably, the intermediate mobile station 940 and 920 may or may not maintain their connection proxies for connection extending over the D2D connection 924 and the D2I connection 921 after the mobile station 970 releases the first indirect connection.

Figure 10:
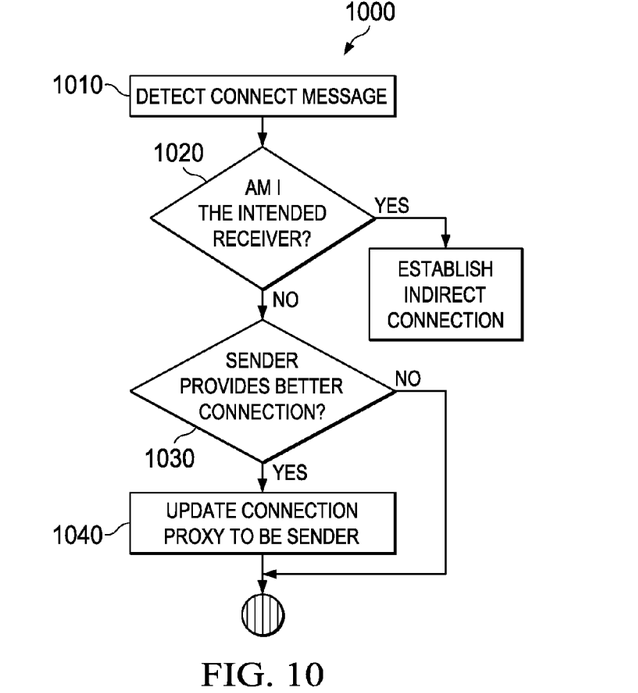
FIG. 10 illustrates a flowchart of an embodiment method for updating connection proxies.

FIG. 10 illustrates a method 1000 for updating a connection proxy in accordance with embodiments of this disclosure, as may be performed by a mobile station. As shown, the method 1000 begins at step 1010, where the mobile station detects a connect message. Thereafter, the method 1000 proceeds to step 1020, the mobile station determines whether it is the intended receiver. If so, then the mobile station establishes the indirect connection. If the mobile station is not the intended receiver, then the method 1000 proceeds to step 1030, where the mobile station determines whether the sender (e.g., the mobile station for which the indirect connection is established) now provides a better connection than an existing connection proxy. If so, the method 1000 proceeds to step 1040, where the mobile station updates his connection proxy.

After a session is over, a device sends a release message along the routing path of the session. Each device along the path releases resources reserved for the session, forwards the message toward the AP, and removes the session's entry in its local session table. The AP also releases resources. A session times out after remaining inactive for a period of time. Devices remove all information about a timed out session and releases resources reserved for it.

Figure 11:
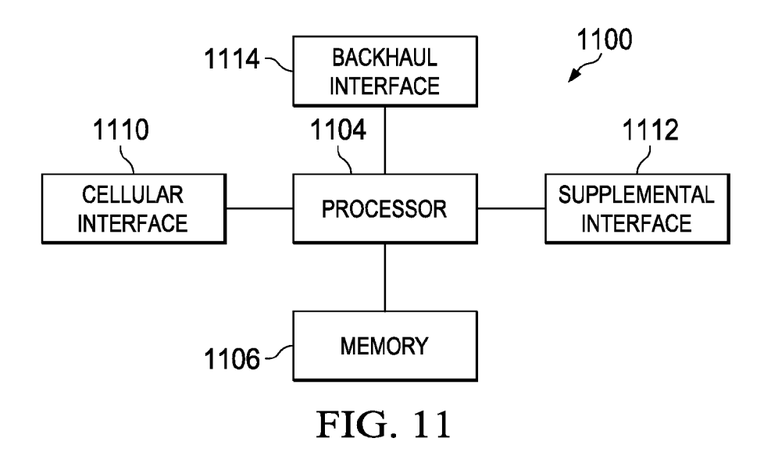
FIG. 11 illustrates a block diagram of an embodiment communications device.

FIG. 11 illustrates a block diagram of an embodiment of a communications device 1100, which may be equivalent to one or more devices (e.g., UEs, NBs, etc.) discussed above. The communications device 1100 may include a processor 1104, a memory 1106, a cellular interface 1110, a supplemental interface 1112, and a backhaul interface 1114, which may (or may not) be arranged as shown in FIG. 11. The processor 1104 may be any component capable of performing computations and/or other processing related tasks, and the memory 1106 may be any component capable of storing programming and/or instructions for the processor 1104. The cellular interface 1110 may be any component or collection of components that allows the communications device 1100 to communicate using a cellular signal, and may be used to receive and/or transmit information over a cellular connection of a cellular network. The supplemental interface 1112 may be any component or collection of components that allows the communications device 1100 to communicate data or control information via a supplemental protocol. For instance, the supplemental interface 1112 may be a non-cellular wireless interface for communicating in accordance with a Wireless-Fidelity (Wi-Fi) or Bluetooth protocol. Alternatively, the supplemental interface 1112 may be a wireline interface. The backhaul interface 1114 may be optionally included in the communications device 1100, and may comprise any component or collection of components that allows the communications device 1100 to communicate with another device via a backhaul network.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for device to device (D2D) link establishment, the method comprising:

broadcasting, by a requesting mobile station, a search message requesting discovery of an indirect connection spanning at least one device-to-device (D2D) interface and a device to infrastructure (D2I) interface, the indirect connection for carrying traffic from the requesting mobile station to a wireless access point (AP), or vice versa, wherein the search message is broadcast by the requesting mobile station prior to the requesting mobile station receiving a beacon message associated with the wireless AP;

receiving, by the requesting mobile station, an offer message from a neighboring mobile device for the indirect connection between the requesting mobile station and the wireless AP, wherein a duration of a delay period between broadcasting the search message and receiving the offer message is proportional to a projected connection quality of the indirect connection; and establishing the indirect connection between the requesting mobile station and the wireless AP.

2. The method of claim 1, wherein the indirect connection includes a first D2D interface between the requesting mobile station and the neighboring mobile device.

3. The method of claim 2, wherein the offer message includes connection quality information specifying a projected quality of the first D2D interface.

4. The method of claim 2, wherein the indirect connection further includes a second D2D interface between the neighboring mobile device and another mobile device.

5. The method of claim 4, wherein the offer message includes connection quality information specifying an actual or projected quality of the second D2D interface.

6. The method of claim 1, wherein the D2I interface terminates at the wireless AP.

7. The method of claim 1, wherein establishing the indirect connection comprises:
sending, by the requesting mobile station, a connect message to the neighboring mobile device; and
sending, by the requesting mobile station, a resource reservation message to the neighboring mobile device to reserve resources over the indirect connection, wherein the resource reservation message is relayed from the neighboring mobile device to the wireless AP.

8. The method of claim 7, wherein the resource reservation message prompts the neighboring mobile device to reserve resources over the D2I interface on behalf of the requesting mobile station.

9. The method of claim 7, wherein the connect message is relayed from the neighboring mobile device to the wireless AP to establish a connection proxy for the indirect connection.

10. The method of claim 7, wherein the resource reservation message prompts the neighboring mobile device to reserve resources over at least one D2D connection on behalf of the requesting mobile station.

11. The method of claim 7, wherein the resource reservation message is relayed from the neighboring mobile device to the wireless AP, and wherein the resource reservation message prompts the wireless AP to reserve resources over the D2I interface on behalf of the requesting mobile station.

12. The method of claim 1, wherein further comprising:
communicating, by the requesting mobile station, data over the indirect connection to the wireless AP; and
sending, by the requesting mobile station, a release message to the neighboring mobile device after communicating the data over the indirect connection, the release message releasing the indirect connection.

13. The method of claim 1, further comprising:
receiving, by the requesting mobile station, a plurality of offer messages from a plurality of neighboring mobile devices, wherein each of the plurality of offer messages include connection quality information for a different one of a plurality of candidate indirect connections; and
selecting, by the requesting mobile station, the indirect connection from the plurality of candidate indirection connections in accordance with the connection quality information.

14. A requesting mobile station comprising:
a processor; and
a computer readable storage medium storing programming for execution by the processor, the programming including instructions to:
broadcast a search message requesting discovery of an indirect connection spanning at least one device-to-device (D2D) interface and a device to infrastructure (D2I) interface, the indirect connection for carrying traffic from the requesting mobile station to an access point (AP), or vice versa, wherein the search message is broadcast by the requesting mobile station prior to the requesting mobile station receiving any beacon message associated with the AP;
receive an offer message from a neighboring mobile device, the offer message for the indirect connection between the requesting mobile station and a wireless access point (AP), wherein a duration of a delay period between the broadcast of the search message and reception of the offer message is proportional to a projected connection quality of the indirect connection; and
establish the indirect connection between the requesting mobile station and the wireless AP, wherein the indirect connection includes one or more D2D interfaces and a device to infrastructure (D2I) interface.

15. A method for device to device (D2D) link establishment, the method comprising:
receiving, by a device, a search message from a requesting mobile station, the search message for discovering radio connections to a wireless access point (AP);
determining, by the device, that a connection request message has not been received from the requesting mobile station prior to expiration of a delay period, the connection request message for establishing a direct or indirect connection with the wireless AP from another device that is different than the device; and
sending, by the device, an offer message for a candidate indirect connection to the requesting mobile station after expiration of the delay period upon determining that a connection request message has not been received from the requesting mobile station prior to expiration of the delay period, wherein the candidate indirect connection extends from the requesting mobile station through the device to the wireless AP, and wherein a duration of the delay period between receiving the search message and sending the offer message is proportional to a projected connection quality of the candidate indirect connection.

16. The method of claim 15, wherein the device is a mobile station, and wherein the candidate indirect connection comprises a device to infrastructure (D2I) interface terminating at the wireless AP and a device to device (D2D) interface extending between the device and the requesting mobile station.

17. The method of claim 16, wherein the connection quality specifies a quality of the candidate indirect connection.

18. The method of claim 16, wherein the connection quality specifies a quality of the D2I interface.

19. The method of claim 16, wherein the connection quality specifies a quality of the D2D interface.

20. The method of claim 15, wherein the device comprises an access point (AP), and wherein the candidate indirect connection comprises a potential device to infrastructure (D2I) interface extending from the requesting mobile station to the AP.

21. The method of claim 15, wherein determining whether the requesting mobile station establishes a direct or indirect connection with the wireless AP prior to expiration of the delay period further comprises:
    monitoring a broadcast channel for a connect message for establishing a connection between the requesting mobile station and another device.

22. The method of claim 15, further comprising receiving, by the device, a connect message from the requesting mobile station.

23. The method of claim 22 further comprising forwarding, by the device, the connect message to the wireless AP to establish an indirect connection from the requesting mobile station to the wireless AP, wherein the indirect connection includes one or more D2D interfaces and a device to infrastructure (D2I) interface.

24. The method of claim 23, further comprising:
    receiving, by the device, a resource reservation message from the requesting mobile station; and
    reserving, by the device, resources over the indirect connection on behalf of the requesting mobile station in accordance with the resource reservation message.

25. The method of claim 24, wherein reserving resources over the indirect connection comprises:
    reserving, by the device, resources over the D2I interface on behalf of the requesting mobile station.

26. The method of claim 24, wherein reserving resources over the indirect connection comprises:
    reserving, by the device, resources over the D2D interface on behalf of the requesting mobile station.

27. A device comprising:
    a processor; and
    a computer readable storage medium storing programming for execution by the processor, the programming including instructions to:
        receive a search message from a requesting mobile station, the search message for discovering wireless connections to a wireless access point (AP);
        determine that a connection request message has not been received from the requesting mobile station prior to expiration of a delay period, the connection request message for establishing a direct or indirect connection with the wireless AP from another device that is different than the device; and
        send an offer message for a candidate indirect connection to the requesting mobile station after expiration of the delay period upon determining that a connection request message has not been not received from the requesting mobile station prior to expiration of the delay period, wherein the candidate indirect connection extends from the requesting mobile station through the device to the wireless AP, and wherein a duration of the delay period between receiving the search message and sending the offer message is proportional to a projected connection quality of the candidate indirect connection extending from the requesting mobile station through the device to the wireless AP.

28. The device of claim 27, wherein the programming further includes instructions to: set the duration of the delay period in accordance with the connection quality of the candidate indirect connection upon receiving the search message.

29. The method of claim 15, further comprising:
    setting, by the device, the duration of the delay period in accordance with the connection quality of the candidate indirect connection upon receiving the search message.

* * * * *